United States Patent
Wang et al.

(10) Patent No.: US 10,303,932 B2
(45) Date of Patent: May 28, 2019

(54) FACE RECOGNITION IN A RESIDENTIAL ENVIRONMENT

(71) Applicant: MIDEA GROUP CO., LTD., Foshan (CN)

(72) Inventors: Dongyan Wang, San Jose, CA (US); Xin Chen, Los Altos, CA (US); Hua Zhou, San Jose, CA (US)

(73) Assignee: MIDEA GROUP CO., LTD., Foshan, Guangdong Province (CN)

( * ) Notice: Subject to any disclaimer, the term of this patent is extended or adjusted under 35 U.S.C. 154(b) by 0 days.

(21) Appl. No.: 15/642,312

(22) Filed: Jul. 5, 2017

(65) Prior Publication Data

US 2019/0012525 A1    Jan. 10, 2019

(51) Int. Cl.
    *G06K 9/00*      (2006.01)

(52) U.S. Cl.
    CPC ..... *G06K 9/00288* (2013.01); *G06K 9/00255* (2013.01)

(58) Field of Classification Search
    CPC ..................... G06K 9/00288; G06K 9/00255
    USPC ......................................................... 382/118
    See application file for complete search history.

(56) References Cited

U.S. PATENT DOCUMENTS

| | | | |
|---|---|---|---|
| 2003/0227439 A1* | 12/2003 | Lee ................... | G06K 9/00221 345/156 |
| 2007/0014439 A1 | 1/2007 | Ando | |
| 2012/0036016 A1* | 2/2012 | Hoffberg ............ | G05B 15/02 705/14.58 |
| 2015/0154229 A1* | 6/2015 | An .................... | G06F 17/30247 707/728 |
| 2015/0220159 A1* | 8/2015 | Hyatt ................. | G06F 3/017 345/156 |
| 2016/0197967 A1* | 7/2016 | Kreifeldt ........... | G06K 9/00255 348/77 |
| 2016/0378079 A1 | 12/2016 | Lee et al. | |

FOREIGN PATENT DOCUMENTS

| | | |
|---|---|---|
| CN | 102622588 A | 8/2012 |
| CN | 103729585 A | 4/2014 |
| CN | 104732210 A | 6/2015 |
| CN | 106295301 A | 1/2017 |

OTHER PUBLICATIONS

International Search Report and Written Opinion issued for PCT/CN2018/083066 dated Jul. 18, 2018.

* cited by examiner

*Primary Examiner* — Justin P. Misleh
(74) *Attorney, Agent, or Firm* — Morgan, Lewis & Bockius LLP

(57) ABSTRACT

A face recognition system of a residential environment identifies an individual present in the residential environment. The residential environment include a plurality of home devices and is associated with a group of different persons. The face recognition system identifies which person in the group is the individual and generate an operating instruction for a home device based on identity of the individual. For example, the face recognition system captures an image set of the individual's head and face and applies the image set to a machine learning model that is trained to distinguish between the different persons based on images of their heads and faces. The face recognition system can retrieve a personal profile of the identified individual, which includes settings of the home device for the identified individual. The face recognition system generates the operating instruction based on the personal profile.

17 Claims, 7 Drawing Sheets

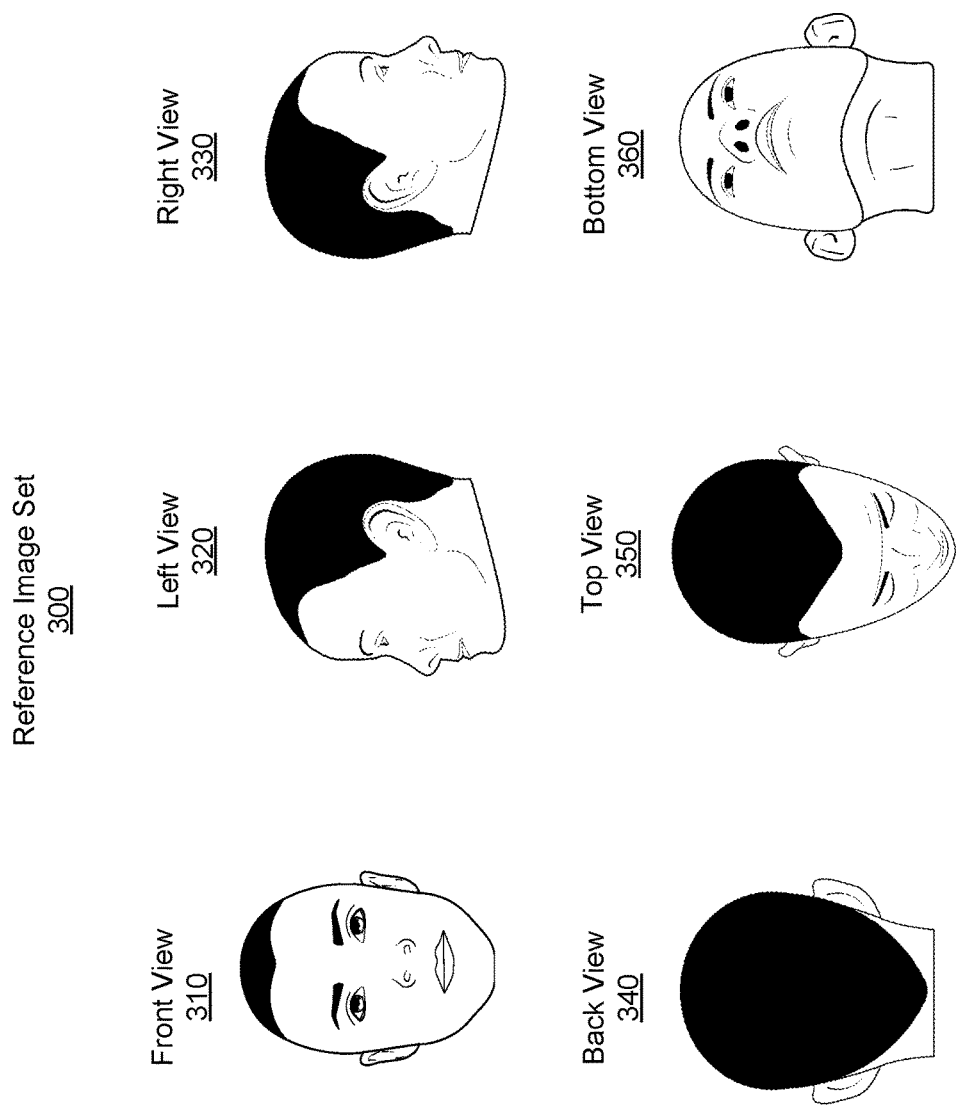

FACE RECOGNITION IN A RESIDENTIAL ENVIRONMENT

BACKGROUND

1. Field of the Invention

This disclosure relates generally to a new frame of face recognition used in a residential environment and controlling home devices based on the identity of the recognized individual.

2. Description of Related Art

A residential environment typically includes multiple persons and many home devices. Those persons often share the home devices but each may have his own preferences for the home devices. For example, one person may prefer an air conditioner to be cooler, while a different person prefers the air conditioner to be warmer. As another example, one person may prefer a kitchen appliance to cook food more well done or prepare certain types of beverages, while a different person prefers less well done or different types of beverages.

Currently, some home devices may provide a user interface that allows its users to set up their preferred settings and restore their preferred settings every time they use the home device. However, a person typically must do this manually every time. Also, different home devices may have different user interfaces and the user interfaces may be difficult to use, making it harder for a person to set up preferences for many home devices.

Therefore, there is a need for improved approaches to interact with and control home devices.

SUMMARY

The present disclosure overcomes the limitations of the prior art by using face recognition to identify an individual present in a residential environment and control home devices based on the identity of the individual. The residential environment includes one or more home devices and is associated with a group of different persons. A machine learning model is trained to distinguish the different persons. When an individual is present in the residential environment, the machine learning model determines the identity of the individual based on images of the individual's head and face. Based on the identity of the individual, an operating instruction for a home device is generated.

In some embodiments, the residential environment includes a face recognition system that trains the machine learning model using reference images of heads and faces of the persons in the group. In one embodiment, the reference images for a person includes six views of the person's head. In another embodiment, the reference images are based on a projection of the person's head as a two-dimensional image. The machine learning model is trained to distinguish the different persons in the group based on training images of the persons' heads and faces.

In operation, one or more cameras capture a set of one or more images of the head and face of an individual in the residential environment. These cameras may be part of the home devices or may be separate. The image set of the individual is presented to the machine learning model, which determines the identity of the individual. In one approach, the machine learning model calculates a probability whether the individual is each of the persons in the group and then makes a decision based on the probabilities. Based on the identity of the individual, the face recognition system generates an operating instruction for one or more of the home devices. The home device receiving the operating instruction operates in a mode customized to the identified person. For example, the home device operates under settings that were selected by the identified person beforehand.

The machine learning model can also identify that none of the persons in the group is the individual. Upon identifying that none of the persons is the individual, the face recognition system can provide a user interface that allows to add a new person into the group.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIG. 3 shows an example set of reference images of the head and face of a resident, in accordance with the invention.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
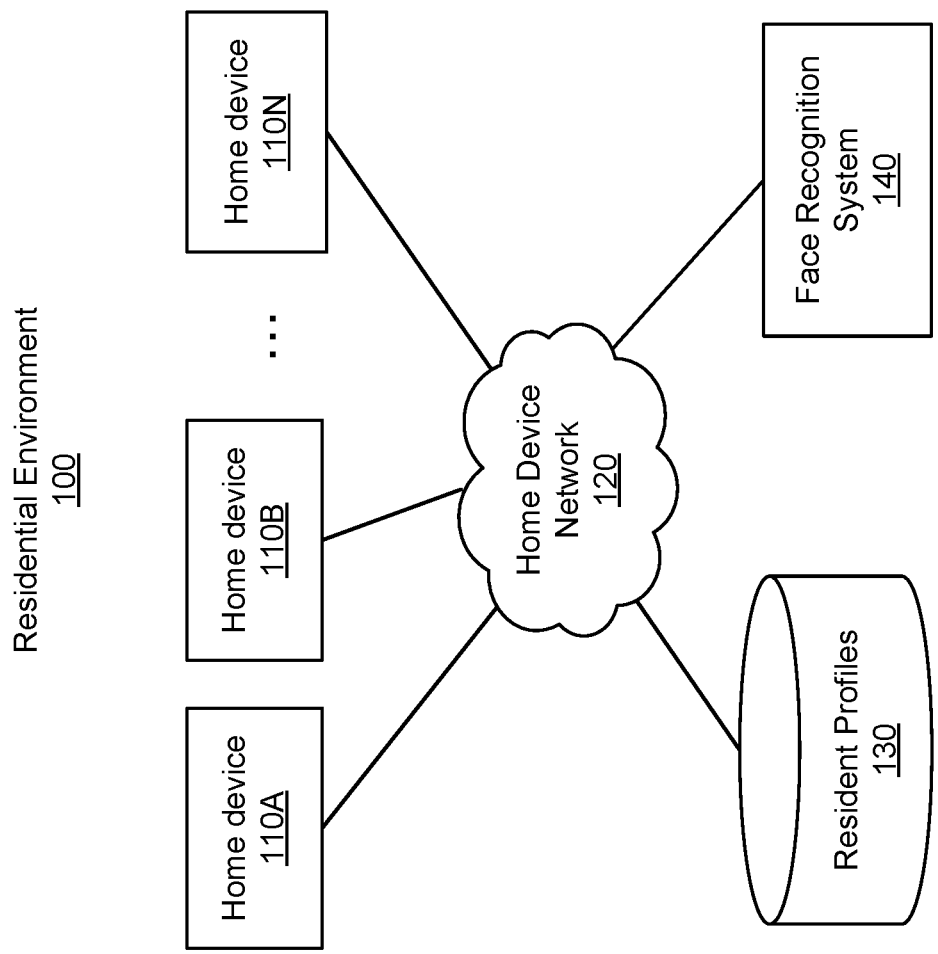
FIG. 1 is a block diagram of a residential environment including a face recognition system, in accordance with the invention.

FIG. 1 is a block diagram of a residential environment 100 including a face recognition system 140, in accordance with the invention. The residential environment 100 is an environment designed for people to live in. The residential environment 100 can be a dwelling, such as a house, a condo, an apartment, or a dormitory. In some embodiments, the face recognition system 140 can be used in a non-residential environment, including for example a work environment (e.g., an office) or a business environment (e.g., a store, a clinic).

A group of different persons are associated with the residential environment 100. The group of different persons may include family members, friends, renters, service staff, or frequent visitors. This group is typically persons who frequent the residential environment. For convenience, the persons in this group will be referred to as residents even though they may not reside in the residential environment. For purpose of illustration and simplicity, the residents in the following disclosure include a Mom, a Dad, and a Daughter. However, this is just an example and the group of residents may include additional or fewer persons or persons of different relationships. In one embodiment, the number of the different persons in the group is less than 20.

In addition to the face recognition system 140, the residential environment 100 in the embodiment of FIG. 1 also includes home devices 110A-N, a home device network 120 connecting the home devices 110, and a resident profiles database 130 that contains residents' preferences for the home devices. The components in FIG. 1 are shown as separate blocks but they may be combined depending on the implementation. For example, the resident profiles 130 may be part of the face recognition system 140 or part of the home devices 110. Also, the residential environment 100 may include a hub for the network 120. The hub may also control the home devices 110 and/or the face recognition system 140. The network 120 preferably also provides access to external devices, such as cloud-based services.

The home devices 110 are household devices that are made available to the different persons associated with the residential environment 100. Examples of home devices 110 include HVAC devices (e.g., air conditioner, heater, air venting), lighting, powered window and door treatments (e.g., door locks, power blinds and shades), powered furniture or furnishings (e.g., standing desk, recliner chair), audio devices (e.g., music player), video device (e.g., television, home theater), environmental controls (e.g., air filter, air freshener), kitchen appliances (e.g., rice cooker, oven, coffee machine, refrigerator), bathroom appliances, and household robotic devices (e.g., vacuum robot, robot butler). The home devices 110 can include other types of devices that can be used in a household.

Home devices 110 are often operated by residents. For example, a user may press an "on" button to turn on the home device 110. The user can also select settings of the home device 110 based on the person's preference. Different residents can select different settings of a home device 110. Take an air conditioner for example. The Daughter selects 70° F. as her preferred temperature for the air conditioner, while the Dad selects 68° F. and the Mom selects 65° F. Those settings are stored in the resident profiles 130. The air conditioner can be used by different people at different times. Thus, when the Daughter intends to use the air conditioner, the air conditioner could be set at the Dad's or the Mom's temperature. In such a situation, the Daughter does not have to manually change the temperature setting of the air conditioner. Instead, the face recognition system 140 identifies the Daughter and the air conditioner is then automatically instructed to operate at the Daughter's preferred temperature.

The face recognition system 140 identifies individuals present in the residential environment 100, from among the group of known residents. It, or some other component in the system, then generates an operating instruction for a home device 110 based on the identity of the individual. The face recognition system 140 uses a machine learning model to distinguish between the different residents based on images of their heads and faces.

In some embodiments, the face recognition system 140 captures a set of one or more images of the individual's head and face while the individual is present in the residential environment 100. In one approach, the face recognition system 140 captures the image upon a request from the individual. Alternatively, the image set may be captured automatically without requiring instruction from the individual. For example, the individual may be walking through a house and various cameras, on home devices and otherwise, capture images from different angles. The face recognition system 140 applies the image set as an input to the machine learning model. The machine learning model outputs the identity of the individual, i.e., which resident if any is the individual.

In one embodiment, the machine learning model identifies the individual based on reference images of heads and faces of the residents. For example, the machine learning model calculates similarities of the captured image set to the reference images of the different residents' heads and faces. In another embodiment, the machine learning model has been trained using the reference images of the different residents' heads and faces but, once trained, the reference images are not expressly used by the machine learning model. For example, the machine learning model may be defined by an architecture and a set of parameters. During training, the references images are used to train the parameters. Once trained, the parameters are sufficient to define the machine learning model. In one architecture, using the image set as an input, the machine learning model estimates probabilities that each resident is the individual. The machine learning model then makes a decision which resident is the individual based on the probabilities.

Using the identity of the individual, the face recognition system 140 generates the operating instruction for the home device 110. The operating instruction is based on the identified resident's preferences. Upon receiving the operating instruction, the home device 110 operates in the mode customized to the identified resident. Continuing the air conditioner example, upon identification that the individual is the Daughter is the individual, the face recognition system 140 generates an operating instruction for the air conditioner to change the temperature setting for the air conditioner to 70° F. More details about the face recognition system 140 is described in conjunction with FIG. 2.

The resident profiles 130 includes information about the different residents. For example, the data storage 130 may store the references images of the different residents, particularly if the reference images are used by the face recognition system 140 to distinguish between different residents. The resident profiles 130 can also include settings and other preferences of the home devices 110 selected by the different residents. These preferences typically are associated with other information about the resident stored in the resident profiles 130. Examples of other information may include a name, a reference number, a title, a feature, or other types of description associated with the resident. For example, the description of the different residents associated with the residential environment 100 can be "Dad," "Mom," and "Daughter." Also, meta data about the different residents can include descriptions such as "long hair," "blue eyes," "no glasses," "high nose" and so on.

The network 120 provides connectivity between the different components of the residential environment 100 and allows the components to exchange data with each other. The term "network" is intended to be interpreted broadly. It can include formal networks with standard defined protocols, such as Ethernet and InfiniBand. In one embodiment, the network 120 is a local area network that has its network equipment and interconnects managed within the residential environment 100. The network 120 can also combine different types of connectivity. It may include a combination of local area and/or wide area networks, using both wired and/or wireless links. Data exchanged between the components may be represented using any suitable format. In some embodiments, all or some of the data and communications may be encrypted.

Figure 2A:
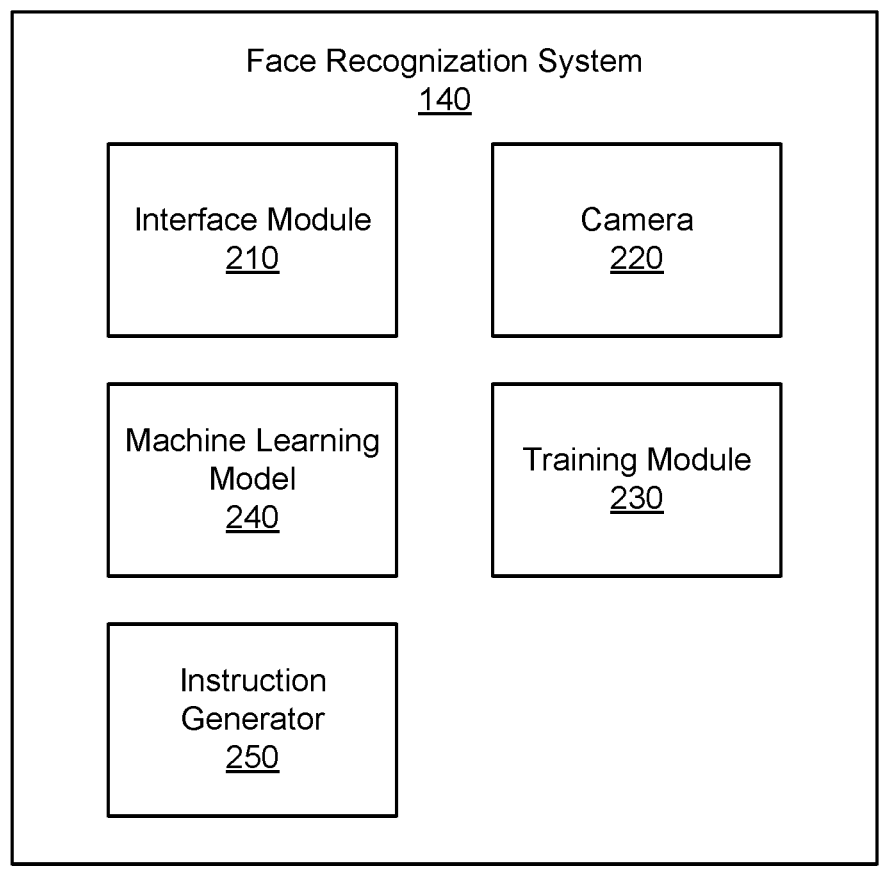
FIG. 2A is a block diagram of a face recognition system, in accordance with the invention.
Figure 2B:
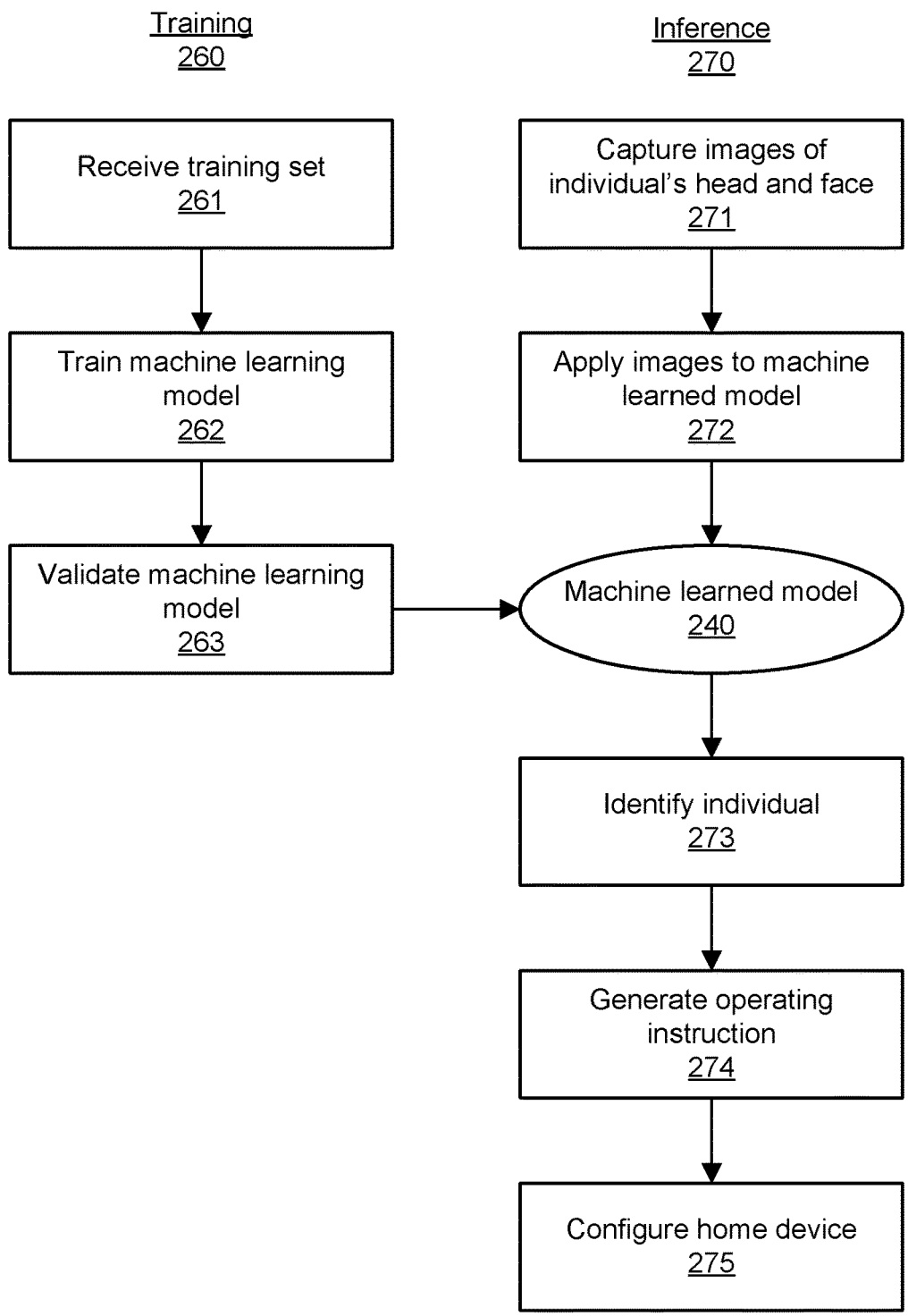
FIG. 2B is a flow chart illustrating a face recognition process of identifying an individual present in a residential environment, in accordance with the invention.

FIG. 2A is a block diagram of a face recognition system 140, in accordance with the invention. The face recognition system 140 includes an interface module 210, one or more cameras 220, a training module 230, a machine learning model 240, and an instruction generator 250. In other embodiments, the face recognition system 140 may include different components. FIG. 2B is a flow chart illustrating a face recognition process 290 of identifying an individual present in a residential environment 100, in accordance with the invention. In one embodiment, the process is conducted by the face recognition system 140. The process 290 includes two main phases: training 260 the machine learning model 240 and inference (operation) 270 of the machine learning model 240.

The interface module 210 facilitates communications of the face recognition system 140 with other components of the residential environment 100. For example, references images of the different residents can be received by the face recognition system 140 via the interface module 210. Requests to identify individuals in the environment can also be received by the face recognition system 140 via the interface module 210. Additionally, the operating instruction for the home device 110 may be dispatched via the interface module 210.

The camera(s) 220 capture (step 271 in FIG. 2B) the image set of the individual. In one embodiment, the camera(s) 220 capture the image set (or part of the image set) upon a request, possibly from the individual or from others. The request may be triggered by turning on a home device 110 or changing a setting of the home device 110 by the individual. Alternatively, the images may be captured automatically without requiring instruction from the individual. For example, the camera(s) 220 capture the image set of the individual when the individual is present within a threshold distance from the home devices 110 or the camera(s) 220 or in a certain area or zone in the residential environment 100. For example, when the individual steps into the residential environment 100, a camera 220 at a front door of the residential environment 100 automatically takes one or more images of the individual. The camera(s) 220 can be part of the home devices 110 or they can be separate.

In many situations, there is more than one camera 220 in the residential environment 100. Accordingly, images captured by different cameras 220 can be from different viewpoints. For example, images captured by a camera in a ceiling light has a top view of the individual's head and face, images captured by a vacuum robot has a bottom view of the individual's head and face, and images captured by a surveillance camera may capture a straight-on view of the individual's face.

The training module 230 trains 260 the machine learning model 240. In operation 270, the machine learning model 240 receives the images of the individual and outputs the identity of the individual. In some embodiments, the machine learning model 240 is defined by an architecture with a certain number of layers and nodes, with weighted connections (parameters) between the nodes. During training, the training module 230 determines the values of parameters (e.g., weights and biases) of the machine learning model 240, based on a set of training samples.

The training module 230 receives 261 a training set for training. The training samples in the set includes reference images of heads and faces of the different residents, some examples of which will be described below. The training module 230 can receive these reference images from the database 130 via the interface module 210. In addition to the reference images, the training set can also include other training images. For example, the machine learning model can be trained using images of the residents' heads and faces that are captured in the residential environment 100. Those images can include images captured by floor-based home devices or ceiling-mounted or high wall mounted home devices. In some embodiments, the machine learning model 240 can be trained using images of the residents from other sources, such as online sources like Facebook. For supervised learning, the training set typically also includes tags for the images. The tags include descriptions of the resident in the image, such as a name, a title, or a feature of the corresponding resident. For examples, tags for the Dad training images can include "Dad," "male," or "short hair."

In typical training 262, a training sample is presented, as an input, to the machine learning model 240, which then produces an output. The output indicates which resident is the training sample (or a confidence level of the estimate). The difference between the machine learning model's output and the known good output is used by the training module 230 to adjust the values of the parameters in the machine learning model 240. This is repeated for many different training samples to improve the performance of the machine learning model 240.

The training module 230 typically also validates 263 the trained machine learning model 240 based on additional validation samples. For example, the training module 230 applies the machine learning model 240 to a set of validation samples to quantify the accuracy of the machine learning model 240. The validation sample set includes images of residents and non-residents, and identities of the residents. The output of the machine learning model 240 can be compared to the known ground truth. Common metrics applied in accuracy measurement include Precision=TP/(TP+FP) and Recall=TP/(TP+FN), where TP is the number of true positives, FP is the number of false positives and FN is the number of false negatives. Precision is how many outcomes the machine learning model 240 correctly predicted had the target attribute (TP) out of the total that it predicted had the target attribute (TP+FP). Recall is how many outcomes the machine learning model 240 correctly predicted had the attribute (TP) out of the total number of validation samples that actually did have the target attribute (TP+FN). The F score (F-score=2*Precision*Recall/(Precision+Recall)) unifies Precision and Recall into a single measure. Common metrics applied in accuracy measurement also include Top-1 accuracy and Top-5 accuracy. Under Top-1 accuracy, a trained model is accurate when the top-1 prediction (i.e., the prediction with the highest probability) predicted by the trained model is correct. Under Top-5 accuracy, a trained model is accurate when one of the top-5 predictions (e.g., the five predictions with highest probabilities) is correct.

The training module 230 may use other types of metrics to quantify the accuracy of the trained model. In one embodiment, the training module 230 trains the machine learning model until the occurrence of a stopping condition, such as the accuracy measurement indication that the model is sufficiently accurate, or a number of training rounds having taken place.

In another embodiment, the machine learning model 240 can be continuously trained 260, even while operating in the residential environment 100 to identify individuals. For example, the training module 230 uses the image set captured by the camera 210 to further train the machine learning model 240.

Training 260 of the machine learning model 240 can also occur on the home device 110 or on other devices coupled to the home device network 120, rather than on the face recognition system 140. Similarly, operation 270 of the machine learning model 240 may occur at the same location as the training 260 or at a different location. In some embodiments, the machine learning model 240 can be trained and execute in a cloud that is outside the residential environment 100. For example, the home device network 120 of the residential environment 110 is connected to the cloud. The residential environment 100 can share computing resources with or from the cloud or store computing resources in the cloud. In one implementation, the training 260 is more computationally intensive, so it is cloud-based or occurs on a home device with significant computing power. Once trained, the machine learning model 240 is distributed to the home devices 110, which can execute the machine learning model using fewer computing resources than is required for training.

In operation 270, the machine learning model 240 uses the captured images of the individual as input 272 to the machine learning model 240. In one architecture, the machine learning model 240 calculates 272 a probability whether the individual is each resident. This calculation can be based on a machine learning model 240 that does not use reference images of the residents for the inference step 270.

Alternately, the machine learning model 240 can use reference images as part of the inference step 270. For example, part of the calculation may be a correlation of input images against reference images for the residents. The machine learning model 240 calculates a similarity of the captured images to reference images of the head and face of each resident. For example, the machine learning model 240 calculates distance between the captured images and each view in the set of reference images for the resident. The different views may be weighted, for example based on their ability to distinguish between different residents. Based on the weights, the machine learning model 240 further calculates a weighed combination based on the distances. The weighted combination can equal to a sum of the products of each distance and its corresponding weight. The weighted combination indicates the similarity of the image set to the reference images of the residents.

Based on the calculated probabilities or similarities, the machine learning model 240 identifies 273 which resident is most likely to be the individual. For example, the machine learning model 240 identifies the resident with the highest probability or similarity as the individual. In a situation where there are multiple residents corresponding to the highest probability or similarity, the machine learning model 240 may further distinguish those residents with the highest probability or similarity. For example, the camera(s) 220 capture additional images of the individual. These additional images can be used to refine the output of the machine learning model 240.

The instruction generator 250 generates 274 the operating instruction based on the identity of the individual. These instructions are used to configure 275 the home devices 110.

In one embodiment, the operating instruction includes an instruction to turn on or turn off one or more home devices 110. In another embodiment, the operating instruction includes an instruction to change settings of one or more home devices 110. For example, the operating instructions includes settings of the home device 110 selected by the identified resident. The instruction generator 250 may retrieve, from the resident profiles 130 via the interface module 210, a profile for the identified individual that includes the settings. It then generates the operating instructions based on the retrieved profile.

In some embodiments, the instruction generator 250 generates 274 operating instructions for more than one home device 110. Those home devices 110 may be associated with each other or associated with the identified resident. For example, based on the identity of the individual, the instruction generator 250 generates operating instructions to all home devices 110 located in a room or zone where the person is located. In another example, the home device 110 requesting the identity of the individual is a kitchen appliance, and the instruction generator 250 generates operating instructions for all related kitchen appliances in the residential environment 100.

The machine learning model 240 may have an output that concludes that none of the residents in the group is the individual. For example, the similarity scores for every possible resident are all below a threshold value. In one embodiment, the threshold value is 0.5. In this case, the face recognition system 140 can provide a user interface to allow addition of a new person to the resident group.

FIG. 3 shows an example set 300 of reference images of the head and face of a resident, in accordance with the invention. For example, the resident can be the Dad. In the embodiment of FIG. 3, the reference image set 300 includes six reference images, which are respectively a front view 310, a left view 320, a right view 330, a back view 340, a top view 350, and a bottom view 360 of the head and face of the Dad. In an alternative embodiment, the reference image set 300 can include additional, fewer, or different views of the head and face of the Dad. For example, the reference image set 300 does not include the back view 340.

The reference image set 300 can be captured by one or more cameras in the residential environment. The one or more cameras may include the camera(s) 220 of the face recognition system 140. In one embodiment, the reference image set 300 is captured by cameras at different locations in the residential environment 100. For example, the top view 350 is captured by a ceiling-mounted or high-wall mounted camera, and the bottom view 360 is captured by a floor-based camera.

The reference images may also be captured in a controlled environment. In one embodiment, the resident is instructed to meet requirements of position and/or orientation. For example, the resident is instructed to face a camera while the front view 310 is being captured, versus facing back to a camera for the back view 340. In another embodiment, a camera capturing a reference image for a view may be associated with a module that determines whether the captured reference image meets requirements for the view. For example, the module can determine whether the captured image meets requirements for the left view 320 based on facial features of the resident, such as nose, eye, and ear. Responsive to a determination that the requirements are not met, the resident is instructed to re-take the image. This process may repeat until a satisfactory reference image for the view is captured. The reference images may also be captured at an external location, such as a local service center for the manufacturer of home devices.

Figure 4:
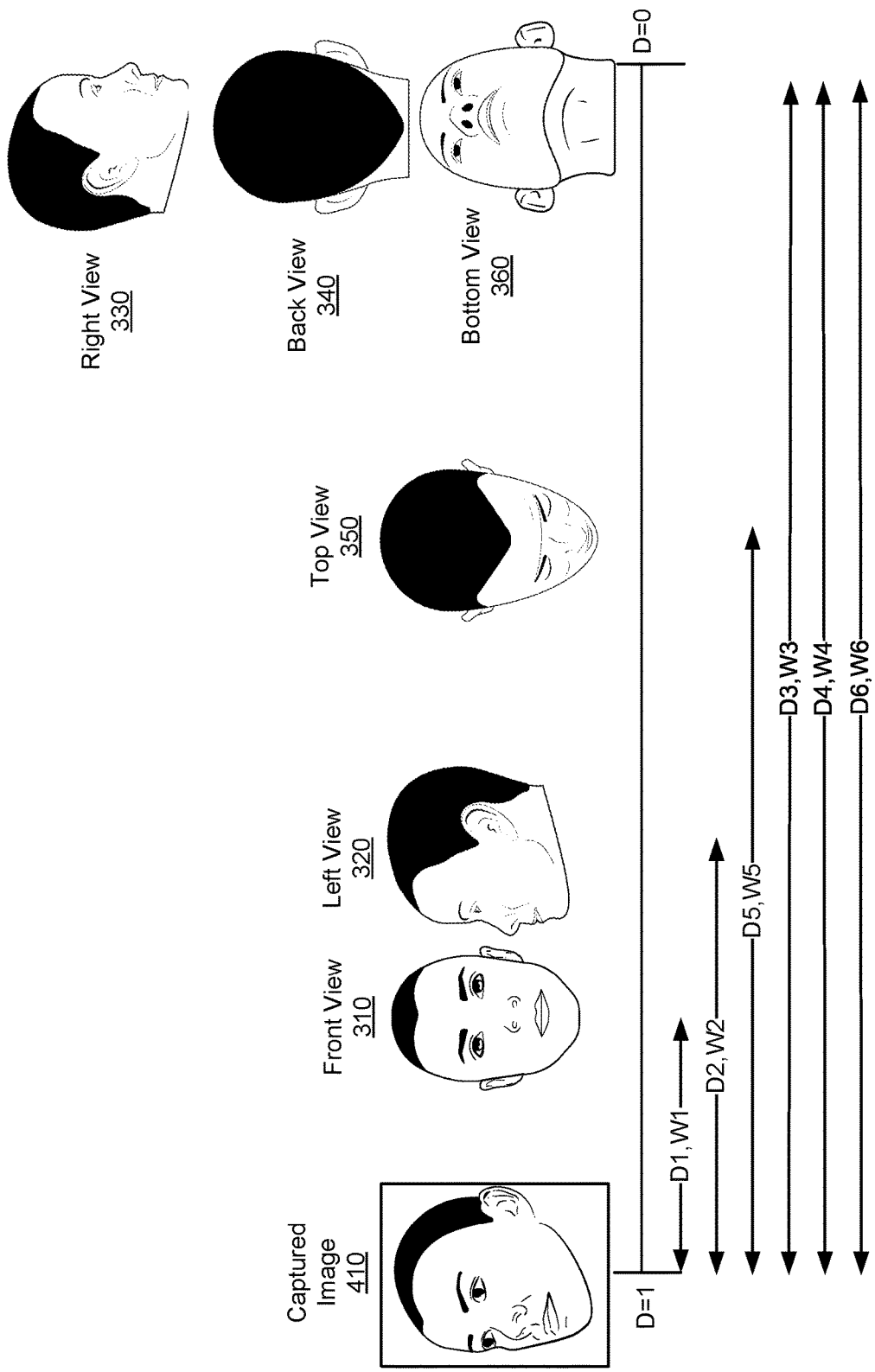
FIG. 4 illustrates identification of an individual present in the residential environment based on the reference images of FIG. 3, in accordance with the invention.

FIG. 4 illustrates identification of an individual based on the reference images of FIG. 3, in accordance with the invention. FIG. 4 includes an image 410 of an individual present in the residential environment 100. The image 410 is captured by the camera(s) 220. In this example, the image set for the individual includes only this one captured image 410. In other embodiments, the image set for the individual includes more than one captured image.

A distance metric D between the captured image 410 and each view of the reference images is calculated. The distance metric D quantifies a similarity between the captured image 410 and corresponding view. In this example, the metric is normalized to the range [0,1], with 1 being the most similar and 0 being the most dissimilar. In FIG. 4, the line immediately beneath the images shows the scale, with 1 below the captured image itself and 0 to the far right. The distance metric between the captured image 410 and the front view 310 is D1, D2 for the left view 320, D3 for the right view 330, D4 for the back view 340, D5 for the top view 350, and D6 for the bottom view 360. The distance metrics D1, D2 and D5 are greater than D3, D4, and D6. Accordingly, the captured image 410 is most similar to the front, left and top views and least similar to the right, back and bottom views.

Each view is also associated with a weight: W1-W6, also normalized to the range [0,1]. The weights vary for the different views. For example, the front view 310 has a larger weight W1 than the back view 340 (weight W4) because the front view 310 shows facial features of the resident that are more useful to distinguish the resident from other persons. Also, different residents in the group can have different weights for a same view. For example, when the Dad is the only resident in the group that has short hair, the weight W4 of his back view 340 may be higher than that of the Mom and the Daughter because the back view 340 of the Dad is more distinguishing than the back views for the Mom and the Daughter in the group.

Based on the distance metrics and weights, the machine learning model 240 calculates a weighted sum of the distance metrics to calculate an overall similarity S of the captured image 410 of the individual to the reference image set 300 of the Dad. The similarity S has a value between 0 and 1, which can be used to calculate a probability that the individual is the Dad. In one embodiment, the machine learning model 240 calculates a similarity between the captured image 410 of the individual to reference images of each resident. These might be the outputs of one layer of the machine learning model. For example, the machine learning model 240 determines that the similarity S is 1 for the Dad, versus 0.2 for the Daughter and 0.2 for the Mom. The machine learning model 240 ranks the similarities for the different residents and identifies which resident is the individual based on these similarity scores. Accordingly, the Dad is identified as the individual.

The calculation performed by the machine learning model has been simplified for purposes of illustration. In actual machine learning models, there typically are many weights and metrics based on each view, and these may be combined across multiple layers of the machine learning model. Different metrics may be directed to specific features or components and may be built up over multiple layers. Metrics may also be calculated based on views from more than one resident (e.g., metrics that try to distinguish the Dad from the Mom). In addition, the weights typically are learned during the training process for the machine learning model, and the formulation for the metrics themselves may also be learned during the training process.

Figure 5:
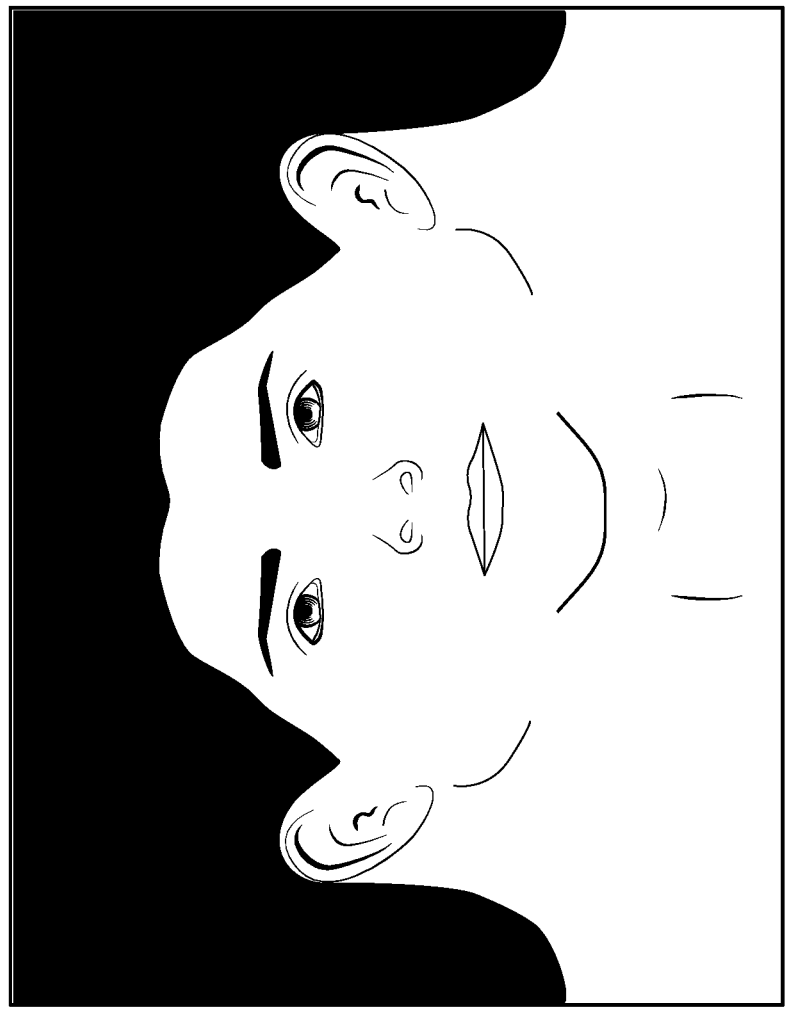
FIG. 5 shows another example of a reference image of the head and face of a resident, in accordance with the invention.

FIG. 5 shows a different type of reference image 500 of the head and face of the resident in FIG. 3, in accordance with the invention. As shown in FIG. 5, the reference image 500 is a two-dimensional projection of the resident's head and face. The reference image 500 may be generated from the reference image set 300 as shown in FIG. 3. Alternatively, the reference image 500 may be generated from a three-dimensional model of the resident's head and face, for example as captured by a 360 degree inward-looking camera. In the projection 500, the most distinguishing features (i.e., the face) is located in the center of the projection.

Figure 6:
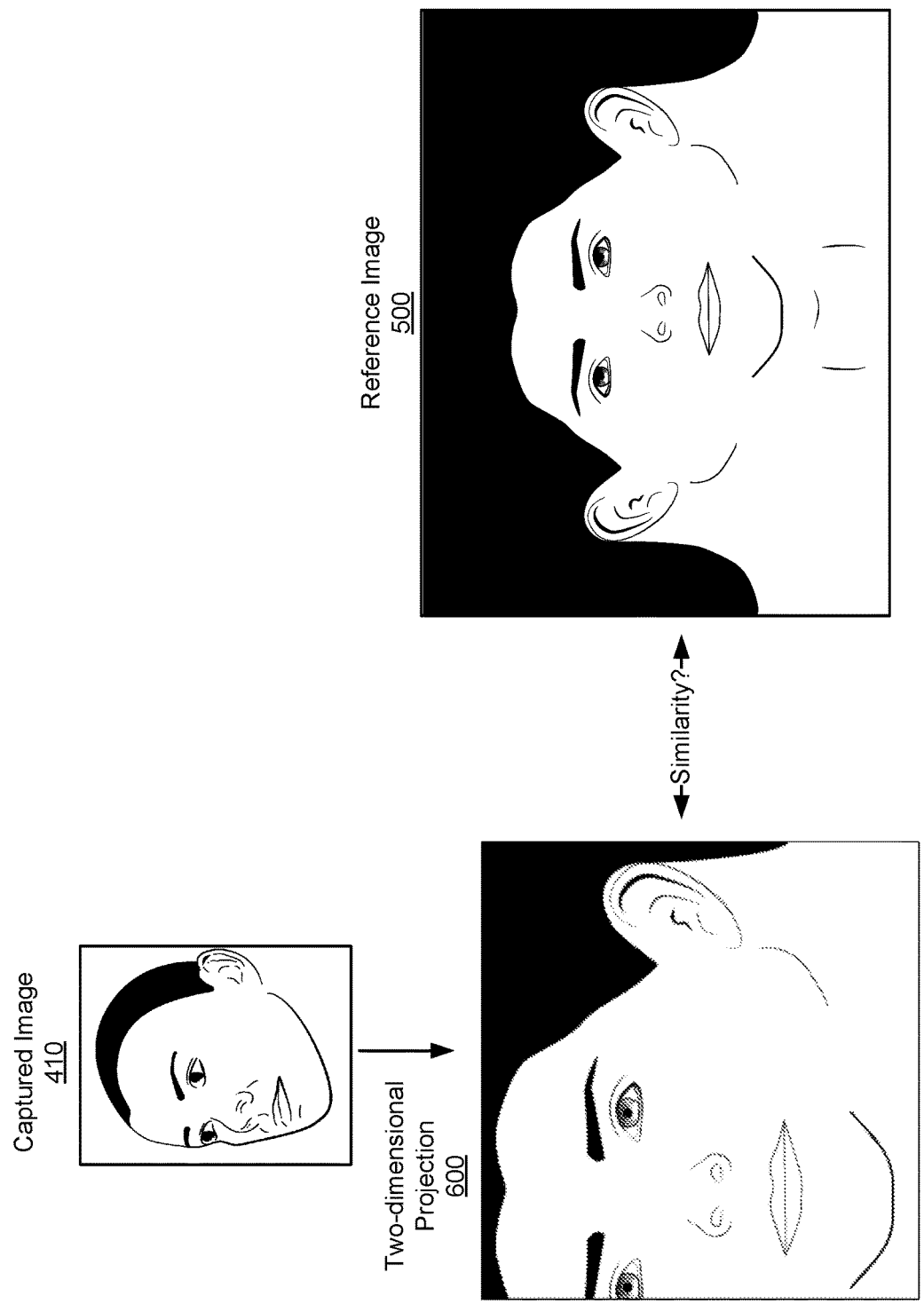
FIG. 6 illustrates identification of an individual present in the residential environment based on the reference images of FIG. 5, in accordance with the invention.

A machine learning model 240 can identify the individual based on two-dimensional projections of heads and faces of the different residents in the group. FIG. 6 illustrates identification of an individual based on the projection reference image 500. As shown in FIG. 6, a two-dimensional projection 600 of the individual is generated based on the captured image 410 of the individual. In some embodiments, the two-dimensional projection 600 may be generated based on multiple images of the individual, particularly if taken from different viewpoints. The two-dimensional projection 610 is used as input to the machine learning model 240, which has been trained using the reference image 500 of the resident. The machine learning model 240 outputs an estimate of which resident is the individual. The approaches shown in FIGS. 3-4 and in FIGS. 5-6 are not mutually exclusive. A machine learning model 240 could be trained using both representations.

In another aspect, identification of an individual can be based on one or more distinguishing features. Examples of distinguishing features include hair style, tattoo, facial mark, eye shape, cheek height, nose shape, and so on. A machine learning model may be trained in a manner that enhances the distinguishing features, so that the machine learning model learns to use the distinguishing features to discriminate between different residents.

Also, the machine learning model 240 can be made accessible to a new home device 110 added to the residential environment 100. For example, the new home device 110 is connected to the face recognition system 140 through the home device network 120. The face recognition system 140 can receive requests from the new home device 110 to identify an individual present in the residential environment. Upon receiving the request, the face recognition system 140 uses the machine learning model 240 to identify the individual. In an alternative implementation, the face recognition system 140, recognizing addition of the new home device 110, transfers the machine learning model 240 to the new home device 110. Additionally, any update of the machine learning model 240 can be made accessible among the home devices 110 of the residential environment 100.

Although the detailed description contains many specifics, these should not be construed as limiting the scope of the invention but merely as illustrating different examples and aspects of the invention. It should be appreciated that the scope of the invention includes other embodiments not discussed in detail above. For example, identification of an individual may be based on information other than images of different views of the individual's head and face. For example, the individual can be identified based on height, weight, or other types of distinctive features. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. In a residential environment comprising a plurality of home devices, a method for identifying an individual present in the residential environment, the method comprising:
    capturing a set of one or more images of an individual's head and face while the individual is present in the residential environment;
    applying the image set as an input to a machine learning model that has been trained to identify the individual from among a group of different persons associated with the residential environment, wherein identifying the individual comprises calculating a similarity of the image set to reference images of heads and faces of the different persons and calculating the similarity comprises:
        calculating distance metrics between the image set and the reference images, and
        calculating a weighted combination based on the distance metrics; and
    generating an operating instruction for one of the home devices based on the identity of the individual.

2. The method of claim 1 wherein the machine learning model is further trained to identify that none of the persons in the group is the individual.

3. The method of claim 1 wherein the machine learning model has been trained on the reference images of the heads and faces of the different persons.

4. The method of claim 3 wherein the reference images include different views of the persons' heads and faces.

5. The method of claim 3 wherein the reference images include a projection of the head and face of each of the different persons as a two-dimensional image.

6. The method of claim 1 wherein the machine learning model has been trained on images of the heads and faces of the different persons, the images of the heads and faces of the different persons captured in the residential environment.

7. The method of claim 1 wherein the machine learning model is further trained while operating in the residential environment to identify individuals.

8. The method of claim 1 wherein training of the machine learning model occurs on the home device.

9. The method of claim 1 wherein training of the machine learning model occurs in a cloud that is outside the residential environment.

10. The method of claim 1 wherein the machine learning model executes on the home device.

11. The method of claim 1 wherein the machine learning model executes in a cloud that is outside the residential environment.

12. The method of claim 1 wherein the home device receiving the operating instruction is one of an HVAC device, lighting, powered window or door treatments, powered furniture or furnishings, an audio device, an environmental control, a kitchen home device, a bathroom home device, and a household robotic device.

13. The method of claim 1 wherein generating the operating instruction comprises:
    retrieving a user profile for the identified individual; and
    generating the operating instruction based on the user profile.

14. The method of claim 1 wherein the operating instruction is an instruction to turn on or turn off the home device.

15. The method of claim 1 wherein the operating instruction is an instruction to change a setting of the home device.

16. The method of claim 1 further comprising:
    automatically making the machine learning model accessible by home devices added to the residential environment.

17. In a residential environment that contains one or more home devices available for operation by residents, a method for facilitating the operation of one of the home devices, the method comprising, within the residential environment:
    capturing a set of one or more images of an individual's head and face while the individual is present in the residential environment, at least some of the images captured by one or more of the home devices in the residential environment;
    applying the image set as an input to a machine learning model that has been trained to identify the individual as one of different residents from a group of known residents of the residential environment, wherein identifying the individual comprises calculating a similarity of the image set to reference images of heads and faces of the different persons and calculating the similarity comprises:
        calculating distance metrics between the image set and the reference images, and
        calculating a weighted combination based on the distance metrics; and
    in response to identification of the individual as one of the residents, generating an operating instruction for one of the home devices based on a preference of the identified resident, the home device configured to operate according to the operating instruction.

* * * * *